United States Patent
Takada

(10) Patent No.: US 10,255,535 B1
(45) Date of Patent: Apr. 9, 2019

(54) IMAGE FORMING APPARATUS AND CONTROL METHOD

(71) Applicants: KABUSHIKI KAISHA TOSHIBA, Tokyo (JP); TOSHIBA TEC KABUSHIKI KAISHA, Tokyo (JP)

(72) Inventor: Setsuo Takada, Izunokuni Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/834,987

(22) Filed: Dec. 7, 2017

(51) Int. Cl.
*H04Q 5/22* (2006.01)
*G06K 17/00* (2006.01)
*G06K 19/077* (2006.01)
*G06K 19/07* (2006.01)

(52) U.S. Cl.
CPC ... *G06K 17/0025* (2013.01); *G06K 19/07749* (2013.01); *G06K 19/0723* (2013.01)

(58) Field of Classification Search
CPC .................................. G06K 1/20; G06K 1/22
See application file for complete search history.

(56) References Cited

U.S. PATENT DOCUMENTS

2007/0251993 A1* 11/2007 Masuta ................. G06K 17/00
235/380

FOREIGN PATENT DOCUMENTS

| JP | 2004-302617 | 10/2004 |
|----|-------------|---------|
| JP | 2007-199535 | 8/2007  |
| JP | 2009-070190 | 4/2009  |

* cited by examiner

*Primary Examiner* — Hongmin Fan
(74) *Attorney, Agent, or Firm* — Kim & Stewart LLP

(57) ABSTRACT

According to one embodiment, an image forming apparatus includes a printer configured to form an image on a sheet at a carrying speed, a first reading/writing unit configured read tag information stored in a wireless tag disposed on the sheet and to write tag information to the wireless tag, a reading/writing control unit configured to control the first reading/writing unit to read tag information stored in the wireless tag and to write tag information to the wireless tag, and a printer control unit configured to control the carrying speed of the sheet according to a total number of wireless tags disposed on the sheet.

20 Claims, 7 Drawing Sheets

FIG. 6

IMAGE FORMING APPARATUS AND CONTROL METHOD

FIELD

Embodiments described herein relate generally to an image forming apparatus and a control method.

BACKGROUND

In the related art, an image forming apparatus that forms an image on a pre-cut sheet and also reads and writes data to a wireless tag disposed on the pre-cut sheet is known. One wireless tag is disposed on each pre-cut sheet. The image forming apparatus reads and writes data to the wireless tags one by one. Since reading and writing of the data to each wireless tag is performed in sequence, processing takes time and productivity is low.

If processing is performed on a plurality of pre-cut sheets, there is a concern that a pre-cut sheet may be discharged before the reading and writing of the data has been completed.

DESCRIPTION OF THE DRAWINGS

FIG. 6 depicts an example of a control touch panel.

DETAILED DESCRIPTION

An image forming apparatus includes a printer configured to form an image on a sheet at a carrying speed, a first reading/writing unit configured read tag information stored in a wireless tag disposed on the sheet and to write tag information to the wireless tag, a reading/writing control unit configured to control the first reading/writing unit to read tag information stored in the wireless tag and to write tag information to the wireless tag, and a printer control unit configured to control the carrying speed of the sheet according to a total number of wireless tags disposed on the sheet.

Hereinafter, an image forming apparatus and a control method according to an embodiment will be described with reference to the drawings.

Figure 1:
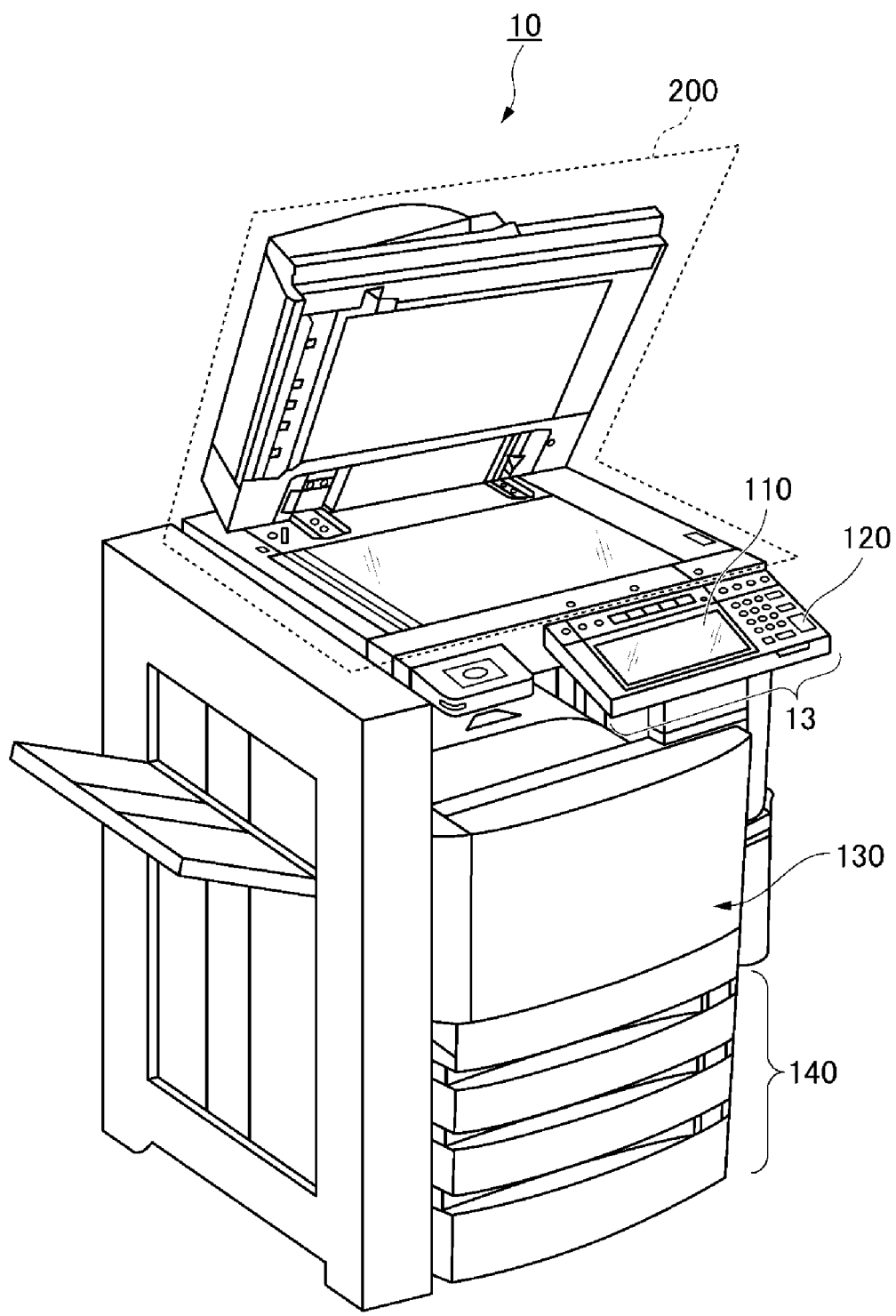
FIG. 1 is an external view of an image forming apparatus according to an embodiment.

FIG. 1 is an external view of an image forming apparatus according to an embodiment. An image forming apparatus 10 is, for example, an image forming apparatus such as a multi-function machine. The image forming apparatus 10 includes a display 110, a control panel 120, a printer 130, a sheet storage unit 140, and an image reading unit 200. The image forming apparatus 10 includes a first reading and writing (RW) unit 203 and a second reading and writing (RW) unit 204 (see FIG. 5). An example of the first RW unit 203 and the second RW unit 204 is a wireless tag reader/writer that performs short-distance wireless communication between the wireless tags using a single antenna. The printer 130 of the image forming apparatus 10 may be a device for forming a toner image or may be an ink jet type device.

The image forming apparatus 10 reads an image appearing on a sheet, generates digital image data, and generates an image file. The sheet is, for example, paper on which characters, images, or the like have been printed, or the like. In general, the sheet material and shape may be anything as long as the information/images on the sheet can be read by the image forming apparatus 10.

The display 110 is an image display device such as a liquid crystal display or an organic electro luminescence (EL) display. The display 110 displays various types of information related to the image forming apparatus 10.

The control panel 120 has a plurality of buttons or the like. The control panel 120 receives instructions from a user via the buttons. The control panel 120 outputs a signal corresponding to an instruction from a user to a control unit of the image forming apparatus 10. Moreover, the display 110 and the control panel 120 may be configured as an integral touch panel. Hereinafter, an example in which the display 110 and the control panel 120 are configured as the integral touch panel will be described. The touch panel in which the display 110 and the control panel 120 are combined is referred to as a control touch panel 13.

The printer 130 forms an image on a sheet according to image information generated by the image reading unit 200 or otherwise image information received via a communication path or the like. A sheet may have a wireless tag disposed thereon (and thus be referred to as a "wireless tag sheet") or may be a sheet without a wireless tag disposed thereon (thus be referred to as an "ordinary sheet"). An example of a wireless tag is a Radio Frequency Identifier (RFID) tag. In the example described hereinafter, the image forming apparatus 10 forms an image on the wireless tag sheets and reads information stored in the wireless tags and/or writes information to the wireless tags.

Prior to the image formation on the wireless tag sheet by the printer 130, short-distance wireless communication is performed between the first RW unit 203 and a wireless tag on the wireless tag sheet for detecting defects in the wireless tag to determine whether or not any of the wireless tags on the wireless tag sheet is defective.

The printer 130 forms an image, for example, as follows. An image forming unit of the printer 130 forms an electrostatic latent image on a photoconductive drum based on image information. The printer 130 forms a visible image by attaching a developer to the electrostatic latent image. The developer may be, for example, a toner. A transfer unit of the printer 130 transfers the visible image onto a sheet. A fixing unit of the printer 130 fixes the visible image to the sheet by heating and pressing the sheet. The sheet on which an image is formed may be a sheet that was stored in the sheet storage unit 140 or may be a sheet fed by hand.

The sheet storage unit 140 stores sheets to be used for forming an image in the printer 130. Specifically, the sheet storage unit 140 includes a sheet feeding cassette in which a wireless tag sheet is stored and a sheet feeding cassette in which an ordinary sheet is stored.

The image reading unit 200 reads the image information on the sheet as brightness of light reflected from the sheet at various positions or the like. The image reading unit 200 records the image information that has been read. The recorded image information may later be used in forming an image on a sheet with the printer 130. The image reading unit 200 includes a detachable auto document feeder (ADF). The ADF feeds the document to be read automatically. The sheet on which an image is formed by the printer 130 is carried to the second RW unit 204. The second RW unit 204 is disposed downstream the printer 130 in the carrying direction of the sheet. The second RW unit 204 performs either one or both of reading of information stored in the wireless tag on the sheet and writing information to the wireless tag.

Wireless Tag Sheet

A wireless tag sheet will be described.

Figure 2:
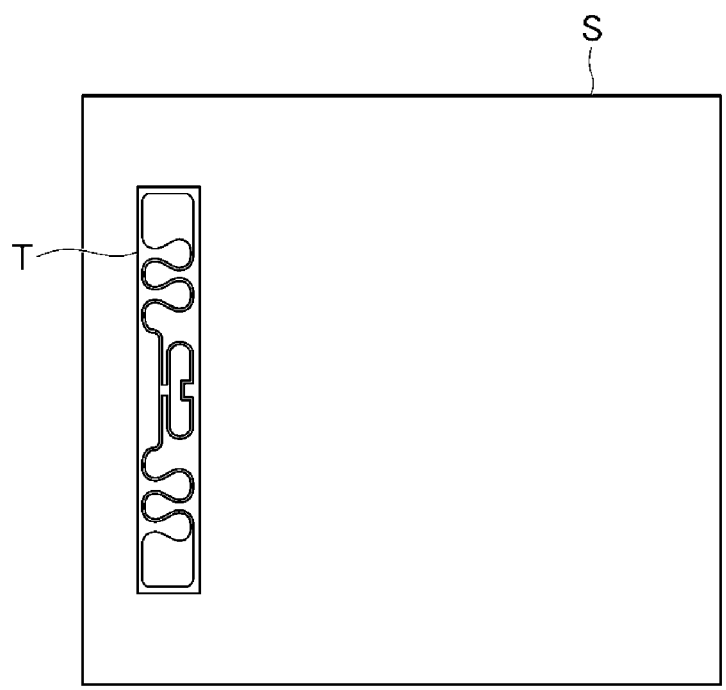
FIG. 2 depicts a first example of a wireless tag sheet.

FIG. 2 is a view illustrating a first example of the wireless tag sheet. In the example illustrated in FIG. 2, one wireless tag T is disposed on a 4"×6" sheet S. Identification information, such as an electronic product code (EPC), is stored in the wireless tag T in advance. Here, the EPC is an identification code for writing in an electronic tag. Hereinafter, as an example of the identification information, a case where the EPC is stored in the wireless tag T will be described.

Figure 3:
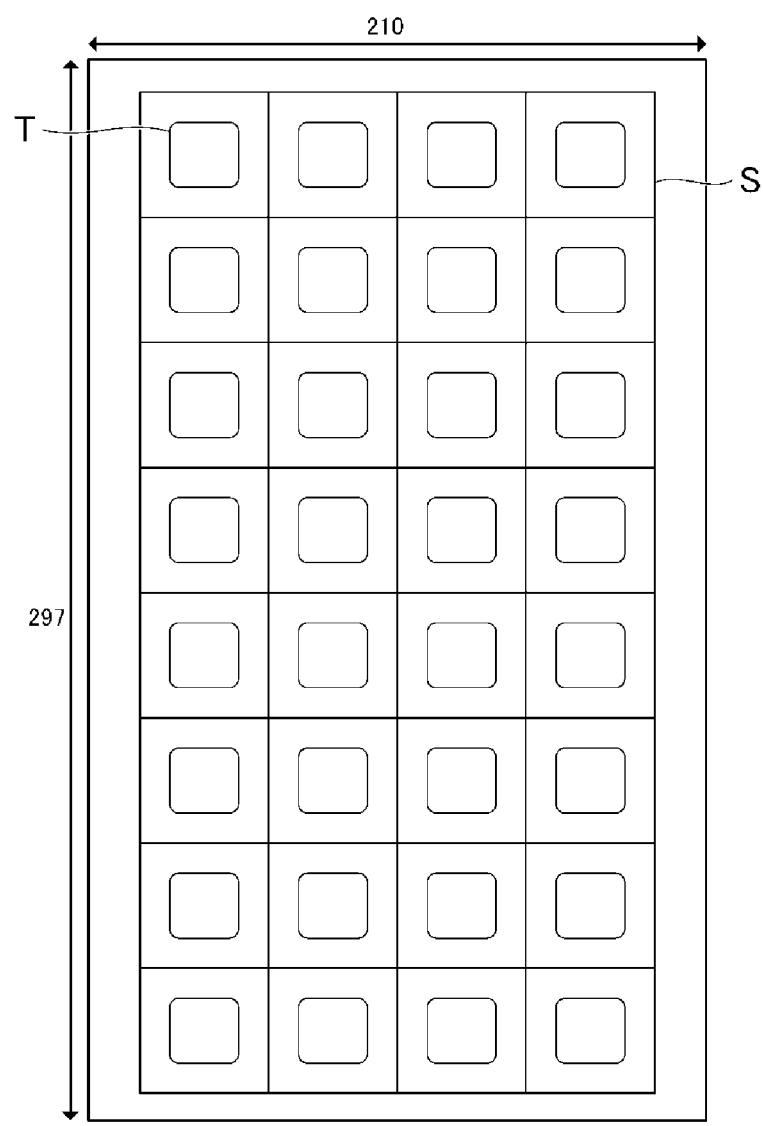
FIG. 3 depicts a second example of a wireless tag sheet.

FIG. 3 is a view of a second example of a wireless tag sheet. In the example illustrated in FIG. 3, total 32 wireless tags T in 8 vertical columns and 4 horizontal rows are disposed on a sheet S of standard A4 size. An EPC is stored in each of the wireless tags T in advance. All the EPCs stored in the wireless tags T may be the same or may be different from each other. Some of the EPCs stored in the wireless tags T may be the same with all the others being different.

Figure 4:
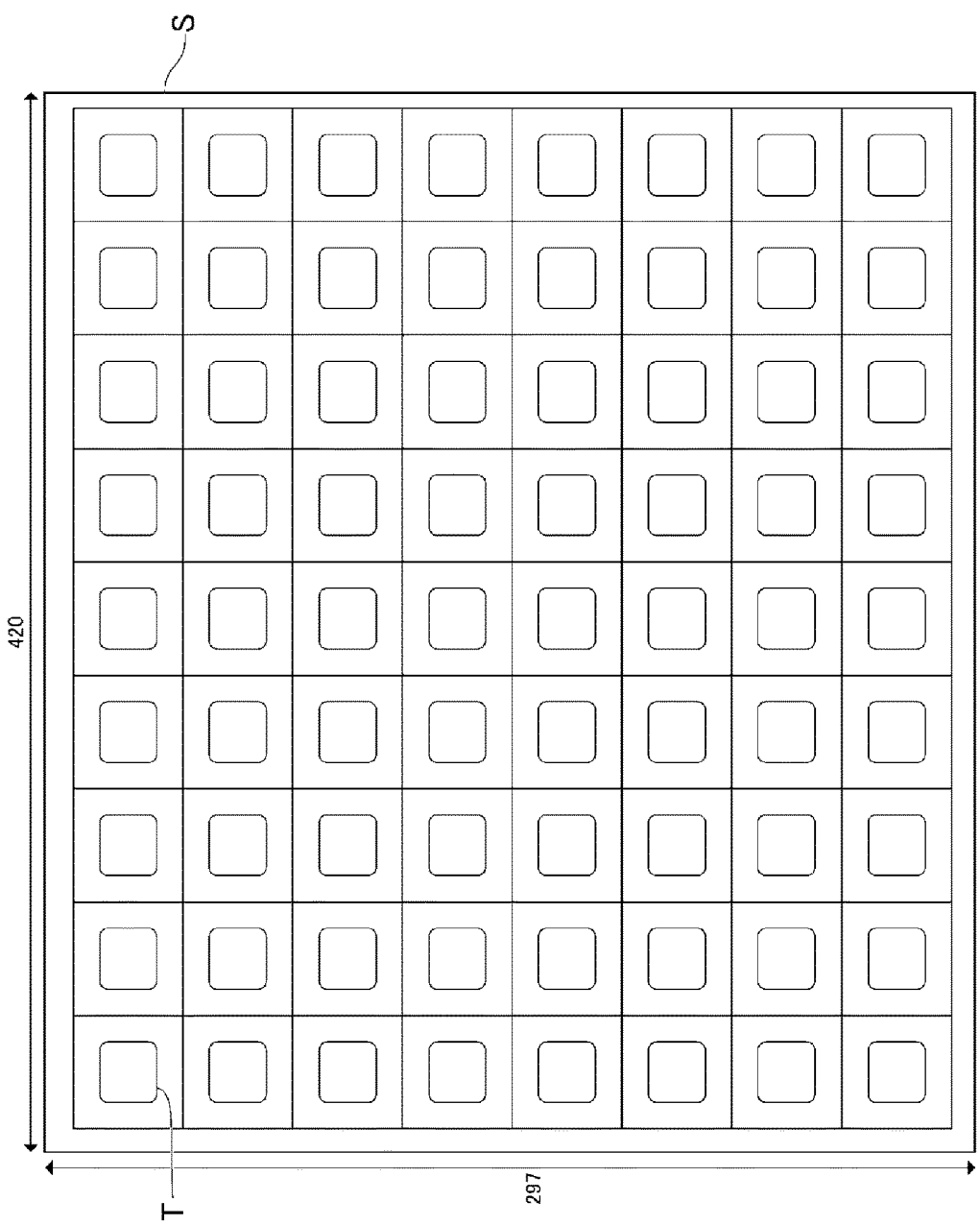
FIG. 4 depicts a third example of a wireless tag sheet.

FIG. 4 is a view of a third example of a wireless tag sheet. In the example illustrated in FIG. 4, total 72 wireless tags T in 8 vertical column and 9 horizontal rows are disposed on a sheet S of standard A3 size. An EPC is stored in each of the wireless tags T in advance. All the EPCs stored in the wireless tags T may be the same or may be different from each other. Some of the EPCs stored in the wireless tags T may be the same as each other with all the others T being different.

Image Forming Apparatus

Figure 5:
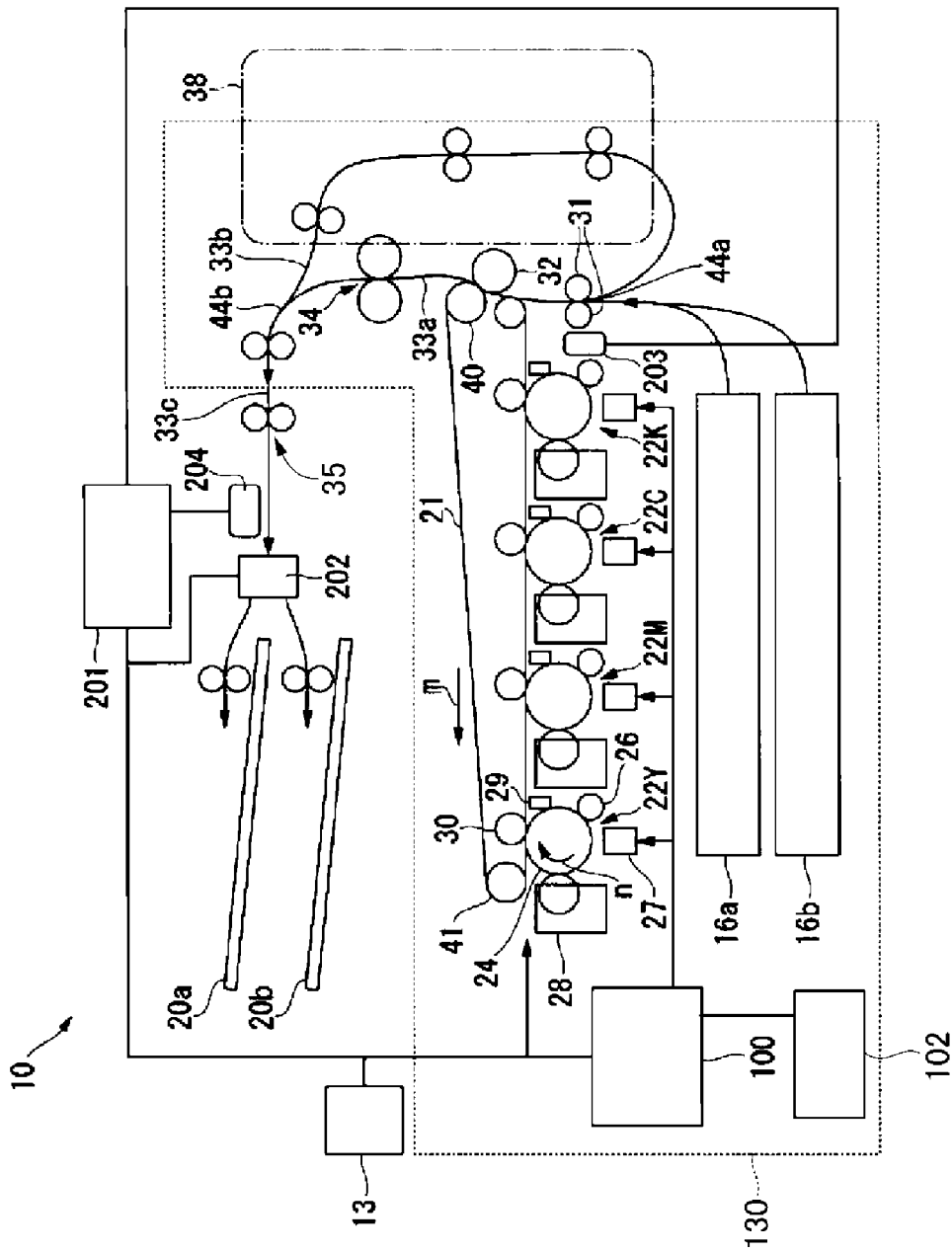
FIG. 5 is a view illustrating of an image forming apparatus according to an embodiment.

FIG. 5 is a view of an image forming apparatus according to the embodiment. The image forming apparatus 10 includes the control touch panel 13, an RW control unit 201, a sheet discharge switching unit 202, a first RW unit 203, a second RW unit 204, the printer 130, an OK tray 20a, and an NG tray 20b. The printer 130 includes a control unit 100, a communication interface (I/F) 102, a sheet feeding cassette 16a, and a sheet feeding cassette 16b.

The control unit 100 is connected to the control touch panel 13, the RW control unit 201, and the sheet discharge switching unit 202. The control unit 100 controls the control touch panel 13, the RW control unit 201, the sheet discharge switching unit 202, and the printer 130.

The control unit 100 includes an ALU (arithmetic logic unit) of a processor such as a Central Processing Unit (CPU) or an Application Specific Integrated Circuit (ASIC). The control unit 100 includes a storage device such as a Read Only Memory (ROM), a Random Access Memory (RAM), a Hard Disk Drive (HDD), and a Solid State Drive (SSD).

The storage device stores printing data. Here, the printing data may be acquired from a terminal device (not illustrated) via the communication I/F 102. The control unit 100 acquires an R/W condition from the control touch panel 13 and sets the acquired R/W condition. The R/W condition will be described later. The control unit 100 develops the printing data into printable data such as raster data or the like and stores the printing data in the storage device.

As described above, the control touch panel 13 is a touch panel integrated with the display 110 and the control panel 120. The control touch panel 13 displays an item related to the operation of the image forming apparatus 10 such as the R/W condition under the control of the control unit 100. A user selects an item related to an operation displayed on the control touch panel 13. If the user selects an item related to an operation, the control touch panel 13 outputs information indicating the item related to the operation selected by the user to the control unit 100.

Control Touch Panel

Figure 6:
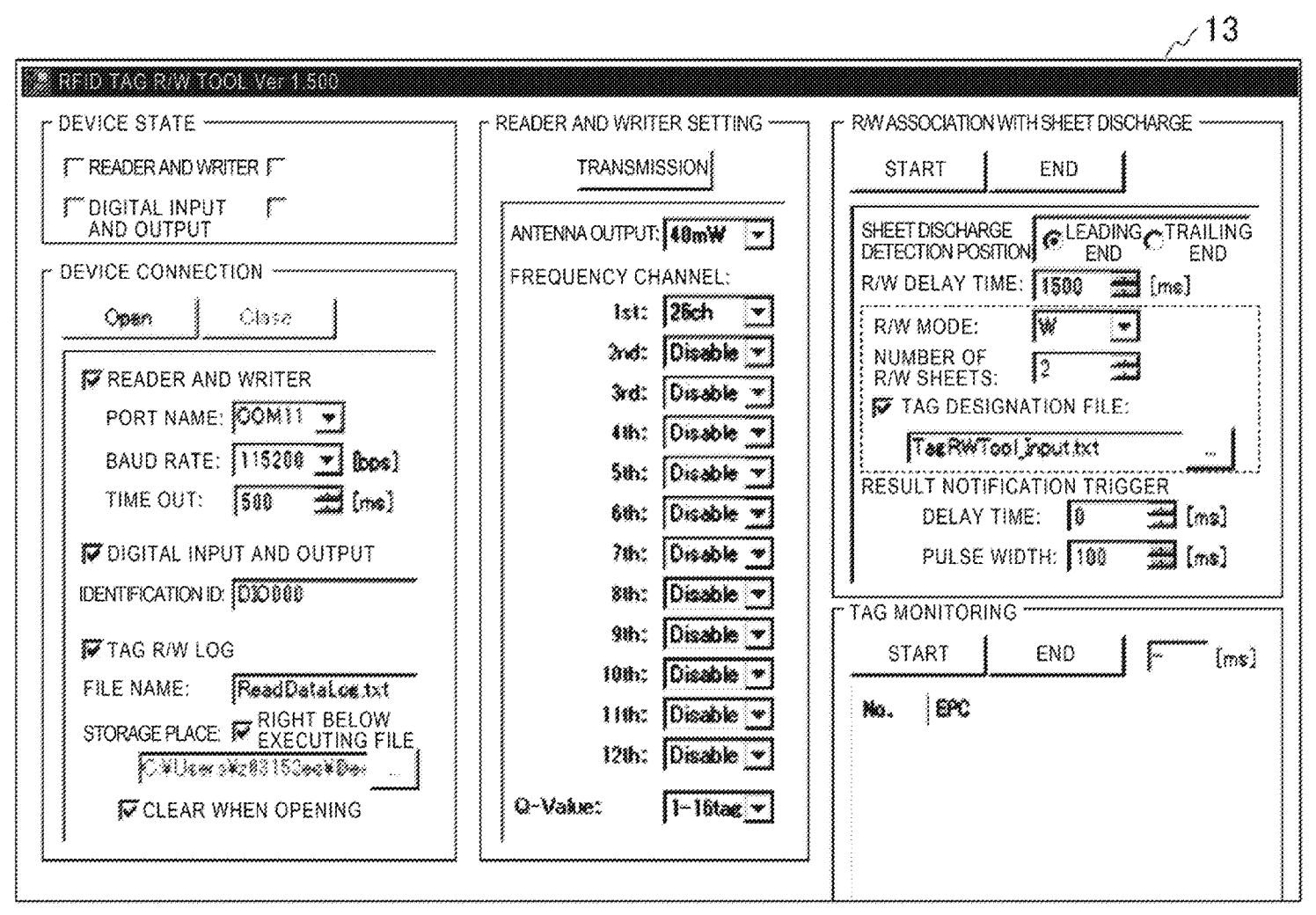

FIG. 6 is a view of a control touch panel in an example. In FIG. 6, a RFID tag R/W tool screen is displayed on the control touch panel 13 from among various operation screens that can be displayed on the control touch panel 13. The R/W conditions such as an R/W mode, the number of R/W sheets, and a tag designating file can be set in the RFID tag R/W tool screen. Specifically, the user can set the R/W mode, the number of the R/W sheets, and the tag designating file by selecting items in the portion surrounded by the broken line among the RFID tag R/W options illustrated in FIG. 6.

For the R/W mode, it is possible to select either one or both of reading the wireless tags or writing to the wireless tag. Hereinafter, reading of information stored in a wireless tag may be described as a "read" and writing of information to a wireless tag may be described as a "write".

The number for the R/W sheets is the number of the wireless tag sheets to be read or written.

The tag designating file associates information with an initial EPC (hereinafter, referred to as a "pre-change EPC") already stored in the wireless tags on the wireless tag sheet prior to processing and a post-processing EPC (hereinafter, referred to as a "post-change EPC") that is newly written to the wireless tags in the processing.

Here, a relationship between the pre-change EPC and the post-change EPC will be described.

Examples of the relationship between the pre-change EPC and the post-change EPC include the following non-limiting example possibilities (1) to (9). As an example, a scenario where 32 wireless tags are disposed on a wireless tag sheet will be described, but the number of wireless tags per wireless tag sheet may be varied.

(1) All of the wireless tags on a wireless tag sheet share a common pre-change EPC and a common post-change EPC.

For example, the common pre-change EPC is "300833B2DDD9014000000000" and the common post-change EPC is "300833B2DDD9014000000001".

(2) All of the wireless tags on a wireless tag sheet share a common pre-change EPS, and all of the wireless tags have post-change EPCs that are different from each other.

For example, the common pre-change EPC is "300833B2DDD9014000000000", and each of the wireless tags has a post-change EPC that differs in a lowest bit or two lowest bits from the common pre-change EPC.

(3) All of the wireless tags on a wireless tag sheet share a common pre-change EPC, some of the wireless tags share a common post-change EPC and the remaining wireless tags have post-change EPCs that are different from each other.

For example, the common pre-change EPC is "300833B2DDD9014000000000," and the post-change EPCs include the common post-change EPC and post-change EPCs that each differ in a lowest bit or two lowest bits from the common pre-change EPC.

(4) All of the wireless tags on a wireless tag sheet have pre-change EPCs that are different from each other, and all of the wireless tags share a common post-change EPC.

For example, the common post-change EPC is "300833B2DDD9014000000000," and each of the wireless tag has a pre-change EPC that differs in a lowest bit or two lowest bits from the common post-change EPC.

(5) All the wireless tags on a wireless tag sheet have pre-change EPCs that are different from each other and post-change EPCs that are different from each other.

For example, each of the wireless tags has a pre-change EPC that differs in a lowest bit or two lowest bits from "300833B2DDD9014000000000," and a post-change EPC that differs in lowest bit or two lowest bits from "300000000000000000000000".

(6) All of the wireless tags on a wireless tag sheet have pre-change EPCs that are different from each other, some of the wireless tags share a common post-change EPC, and the remaining wireless tags have post-EPCs that are different from each other.

For example, each of the wireless tags has a pre-change EPC that differs in a lowest bit or two lowest bits from "300833B2DDD9014000000000," and the post-change EPCs includes the common post-change EPC and post-change EPCs that each differ in a lowest bit or two lowest bits from "300000000000000000000000."

(7) Some of the wireless tags on a wireless tag sheet shares a common pre-change EPC, the remaining wireless tags have pre-change EPCs that are different from each other, and all of the wireless tags share a common post-change EPC.

For example, the pre-change EPCs includes the common pre-change EPC and pre-change EPCs that each differ in a lowest bit or two lowest bits from "300833B2DDD9014000000000," and the common post-change EPC is "300833B2DDD9014000000000".

(8) Some of the wireless tags on a wireless tag sheet shares a common pre-change EPCs, the remaining wireless tags have pre-change EPC that are different from each other, and all of the wireless have post-change EPCs that are different from each other.

For example, the pre-change EPCs include the common pre-change EPC and pre-change EPCs that each differ in a lowest bit or two lowest bits from "300833B2DDD9014000000000," and each of the wireless tags have a post-change EPC that differs in a lowest bit or two lowest bits from "300000000000000000000000".

(9) Some of the wireless tags on a wireless tag sheet share a common pre-change EPCs, the remaining wireless tags have pre-change EPCs that are different from each other, some of the wireless tags share a common post-change EPC, and the remaining wireless tags have post-change EPCs that are different from each other.

For example, the pre-change EPCs include the common pre-change EPC and pre-change EPCS that each differ in a lowest bit or two lowest bits from "300833B2DDD9014000000000." The post-change EPCs include the common post-change EPC and post-change EPCs that each differ in a lowest bit or two lowest bits from "300000000000000000000000."

Referring back to FIG. 5, the sheet feeding cassette 16a stores the wireless tag sheet. The sheet feeding cassette 16b stores the ordinary sheet. If the wireless tag sheet and the ordinary sheet are not required to be distinguished, both are referred to as "sheets." For the sheet, a material such as paper or a plastic film is used, for example.

The printer 130 performs an image forming operation under the control of the control unit 100. The control unit 100 controls carrying timing of the sheet, a stop position of the sheet, the carrying speed of the sheet, or the like. The printer 130 forms an image on the wireless tag sheet by printing the image by processing image information.

The printer 130 includes an intermediate transfer belt 21, a driven roller 41 and a backup roller 40. The intermediate transfer belt 21 is supported by the driven roller 41 and the backup roller 40. The intermediate transfer belt 21 is rotated in a counterclockwise direction depicted by the arrow m by the driven roller 41 and the backup roller 40.

The printer 130 includes image forming stations 22Y, 22M, 22C, and 22K. The image forming station 22Y is for forming an image of yellow (Y), the image forming station 22M is for forming an image of magenta (M), the image forming station 22C is for forming an image of cyan (C), and the image forming station 22K is for forming an image of black (K).

As illustrated in FIG. 5, each of the image forming stations 22Y, 22M, 22C, and 22K is disposed downstream from the intermediate transfer belt 21. Each of the image forming station 22Y, 22M, 22C, and 22K is disposed in this order along a rotating direction of the intermediate transfer belt 21.

Hereinafter, any one of the image forming stations 22Y, 22M, 22C, and 22K may be simply referred to as an image forming station 22.

Each image forming station 22 includes a photoconductive drum 24, an electrifying charger 26, an exposure scanning head 27, a developing device 28, a photoconductive cleaner 29, and a primary transfer roller 30. The electrifying charger 26, the exposure scanning head 27, the developing device 28, and the photoconductive cleaner 29 are disposed around the photoconductive drum 24. The photoconductive drum 24 is disposed downstream from the intermediate transfer belt 21 and is rotated in the clockwise direction depicted by the arrow n. The primary transfer roller 30 is disposed at a position facing the photoconductive drum 24 with respect to the intermediate transfer belt 21.

After the photoconductive drum 24 is charged by the electrifying charger 26, the exposure scanning head 27 is exposed. As a result, an electrostatic latent image is formed on the photoconductive drum 24. The developing device 28 develops the electrostatic latent image on the photoconductive drum 24 by using a two-component developer formed by a toner and a carrier. An example of a developing method is a tandem developing method.

The primary transfer roller 30 transfers (referred to as a primary transfer) a toner image formed on the photoconductive drum 24 to the intermediate transfer belt 21. The photoconductive cleaner 29 removes the toner remaining on the photoconductive drum 24 after the primary transfer.

In each of the image forming stations 22Y, 22M, 22C, and 22K, the primary transfer roller 30 forms the toner image on the intermediate transfer belt 21. The toner images of yellow, magenta, cyan, and black are formed to be sequentially overlapped on the intermediate transfer belt 21.

The printer 130 includes a secondary transfer roller 32. The secondary transfer roller 32 faces the backup roller 40 with respect to the intermediate transfer belt 21. The secondary transfer roller 32 collectively transfers (referred to as a secondary transfer) color toner images on the intermediate transfer belt 21 on the sheet. Here, the toner image may include a color toner image, a monochrome toner image, or a toner image formed using a decolorable toner.

The printer 130 includes a carrying path 33a, a carrying path 33b, a carrying path 33c, a joining unit 44a, a branching unit 44b, and a duplex printing device 38. The carrying path 33a is a path from the joining unit 44a to the branching unit 44b. The carrying path 33b is a path passing through the duplex printing device 38 and from the branching unit 44b to the joining unit 44a. The carrying path 33a does not pass through the duplex printing device 38. The carrying path 33c is a path from the branching unit 44b to the sheet discharge switching unit 202.

The printer 130 includes a registration roller 31 and a fixing device 34. A leading end of the sheet taken out from the sheet feeding cassette 16a or the sheet feeding cassette 16b abuts against a portion which is in contact with two stopped registration rollers 31. The sheet abuts against the registration roller 31 and thereby an inclination of the sheet is corrected.

The rotation of the registration roller 31 is started according to a position of the toner image of the rotating intermediate transfer belt 21 and thereby the control unit 100 moves the sheet to the position of the secondary transfer roller 32. The control unit 100 secondarily transfers the toner image formed on the intermediate transfer belt 21 to the sheet by the secondary transfer roller 32. The sheet is carried to the carrying path 33a, the toner image is fixed to the sheet by the fixing device 34 and thereby the control unit 100 forms an image. The sheet on which an image is formed is carried to the carrying path 33c and thereby the control unit 100 discharges the sheet.

In a case of duplex printing, the control unit 100 carries the sheet on which an image is formed on a front surface to the carrying path 33c. After an entire sheet passes through the branching unit 44b, the control unit 100 switches back and carries the sheet to the carrying path 33b. The control unit 100 carries the sheet to the joining unit 44a via a carrying path in the duplex printing device 38 and carries the sheet to the carrying path 33a via the registration roller 31. The toner image is fixed by the fixing device 34 and thereby the control unit 100 forms an image on a back surface of the sheet. The sheet where the image is formed on the back surface is carried to the carrying path 33c and thereby the control unit 100 discharges the sheet.

The carrying path 33b is also used as a carrying path for evacuating the sheet. Specifically, the control unit 100 carries the sheet where the image is formed on the front surface to the carrying path 33c. After the entire sheet passes through the branching unit 44b, the control unit 100 switches back the sheet to the carrying path 33b and carries the sheet until the entire sheet passes through the branching unit 44b. With such a configuration, since the sheet is ejected from the carrying path 33a, the control unit 100 can carry another sheet from the carrying path 33a to the carrying path 33c. When the ejected sheet is discharged, unlike a case of duplex printing, the control unit 100 carries the sheet toward the branching unit 44b and carries the sheet to the carrying path 33c, thereby discharging the sheet.

The RW control unit 201 includes an ALU of a processor (not illustrated) and a storage device (not illustrated). The RW control unit 201 controls the first RW unit 203 and the second RW unit 204 under the control of the control unit 100.

The first RW unit 203 and the second RW unit 204 perform short-distance wireless communication with the wireless tag. The first RW unit 203 and the second RW unit 204 read information stored the wireless tags on the wireless tag sheet and/or write information to the wireless tags.

First RW Unit

The first RW unit 203 is disposed at a position before the image is formed on the wireless tag sheet, for example, a position between the sheet feeding cassette 16a and the registration roller 31. The first RW unit 203 performs reading and/or writing when the wireless tag is at a position at which the wireless tag sheet abuts against the registration roller 31 and has been stopped.

Specifically, when reading is performed after writing, the RW control unit 201 generates a write command for writing information to the wireless tag and outputs the command to the first RW unit 203. The first RW unit 203 receives the write command output by the RW control unit 201 and transmits information according to the write command to the wireless tag. The wireless tag receives the write command transmitted by the first RW unit 203 and stores the information according to the received write command.

The RW control unit 201 generates a read command for reading information stored in the wireless tag and outputs the command to the first RW unit 203. The first RW unit 203 receives the read command output by the RW control unit 201 and transmits the read command to the wireless tag. The wireless tag receives the read command transmitted by the first RW unit 203 and then transmits stored information according to the received read command. The first RW unit 203 receives the information transmitted by the wireless tag and outputs this information to the RW control unit 201.

The RW control unit 201 acquires the information from the first RW unit 203 and can check that the information has been correctly written by comparison of the received information and the information that was to be written according to the write command. The RW control unit 201 may determine whether or not the information has been correctly written by reading a check bit (also referred to as a check digit) stored in the wireless tag. The RW control unit 201 performs the same processing with respect to all the wireless tags on the wireless tag sheet.

If it is determined that there is wireless tag in which the information has not been correctly written on the wireless tag sheet, the RW control unit 201 determines that the wireless tag sheet is defective. If it is determined that the wireless tag sheet is defective, the RW control unit 201 outputs information to the control unit 100 indicating that a defect has been detected. With such a configuration, the RW control unit 201 can detect a defect in a wireless tag on the wireless tag sheet before an image is formed on the wireless tag sheet.

If a defect is detected before the image is formed on the wireless tag sheet, the carrying speed of the wireless tag sheet can be controlled by the control unit 100.

The control unit 100 reduces the carrying speed of the wireless tag sheet in the vicinity of the registration roller 31. The control unit 100 generally controls the carrying speed by delaying the rotation of the registration roller 31 so that during the time required for writing and reading of information to/from the wireless tag (s), the distance between the RW unit 203 and the wireless tag(s) is maintained at a short distance at which wireless communication can be performed. As the distance between the first RW unit 203 and the wireless tag is decreased, the signal strength transmitted by the first RW unit 203 can be reduced. That is, the signal output of the first RW unit 203 can be reduced by lowering the carrying speed. Power consumption can be reduced by reducing the output of the first RW unit 203.

Second RW Unit

The second RW unit 204 is disposed at a position after the image has been formed on the wireless tag sheet, for example, a position that is after the fixing device 34 and before the sheet discharge switching unit 202.

The second RW unit 204 performs reading and writing with respect to the wireless tag at a position at which the sheet is discharged from the carrying path 33c. Specifically, the RW control unit 201 generates a response request and outputs the response request to the second RW unit 204. An example of the response request is a query. The second RW unit 204 receives the response request output by the RW control unit 201 and transmits the response request to the wireless tag sheet.

When the response request is received, the wireless tags which are disposed on the wireless tag sheet transmit a response at random timing.

The second RW unit 204 receives the response(s) transmitted by the wireless tags and outputs the received response (s) to the RW control unit 201. The RW control unit 201 outputs an acknowledgment response (ACK) to the second RW unit 204 if acquired tag response is 1. The second RW unit 204 receives the ACK output by the RW control unit 201 and transmits the ACK. A wireless tag which transmitted the response receives the ACK and transmits an EPC based on the received ACK.

When responses transmitted by the wireless tags conflict, the second RW unit 204 re-transmits the response request to the wireless tags after a predetermined time elapses. If a response is not received even after the predetermined time elapses, the second RW unit 204 detects that a response transmitted the wireless tags conflicts. When confliction is continuously detected, the second RW unit 204 re-transmits the request up to a number of times corresponding to the number of the wireless tags which are disposed on the wireless tag sheet.

The second RW unit 204 receives the EPC transmitted by the wireless tag and outputs the received EPC to the RW control unit 201. The RW control unit 201 acquires the EPC output by the second RW unit 204, designates the wireless tag to which the EPC has been written, and performs reading of the information stored in the wireless tag and/or writing of the information to the wireless tag. Here, a case where the RW control unit 201 controls the second RW unit 204 so as to perform writing of a post-change EPC to the wireless tag will be described. The RW control unit 201 designates a wireless tag according to a received (pre-change) EPC, then performs writing of a post-change EPC to the designated wireless tag, and then performs reading of the information stored in the wireless tag.

The RW control unit 201 designates the wireless tag to which a particular pre-change EPC has been written as a destination, generates a write command so as to write a post-change EPC to the designated wireless tag, and outputs this write command to the second RW unit 204. The second RW unit 204 acquires the write command output by the RW control unit 201 and transmits information according to the acquired write command to the wireless tag. The wireless tag receives the information according to the write command transmitted by the second RW unit 204 and stores the post-change EPC according to the write command.

The RW control unit 201 designates the wireless tag to which an EPC has been written as the destination and creates a read command to read the information stored in the wireless tag. The RW control unit 201 outputs the created read command to the second RW unit 204. The second RW unit 204 acquires the read command output by the RW control unit 201 and transmits the acquired read command to the wireless tag. The wireless tag receives the read command transmitted by the second RW unit 204 and transmits the stored information according to the received read command.

The second RW unit 204 acquires the information transmitted by the wireless tag and outputs the acquired information to the RW control unit 201. The RW control unit 201 acquires the information output by the second RW unit 204 and checks that the information is correctly written based on the acquired information and the post-change EPC requested to be written by the write command. The RW control unit 201 determines whether or not the information is correctly written by reading the check bit stored in the wireless tag. Hereinafter, processing for checking that the information is correctly written by the RW control unit 201 based on the information stored in the wireless tag output by the second RW unit 204 and the information requested to be written by the write command is referred to as "verification".

If it is determined that the information is not correctly written, the RW control unit 201 designates the wireless tag as the destination and re-creates the write command to write the post-change EPC to the wireless tag. The RW control unit 201 outputs the write command to the second RW unit 204. The second RW unit 204 acquires the write command output by the RW control unit 201 and transmits the acquired write command to the wireless tag. The wireless tag receives the write command transmitted by the second RW unit 204 and writes the post-change EPC according to the received write command. The RW control unit 201 again performs the verification. If it is determined that the post-change EPC is not correctly written as a result of performing a predetermined number of verifications, the RW control unit 201 determines that the wireless tag is defective. If it is determined that the post-change EPC is correctly written, the RW control unit 201 determines that the wireless tag is good.

The RW control unit 201 performs the same processing on all the wireless tags which are disposed on the wireless tag sheet. If it is determined that the wireless tag to which the information is not correctly written is included in the wireless tag sheet, the RW control unit 201 determines that the wireless tag sheet is defective. If it is determined that the wireless tag sheet is defective, the RW control unit 201 outputs information that the defect is detected, to the control unit 100.

When an image is formed on the wireless tag sheet, the wireless tag may be damaged by heat or a pressure applied to the wireless tag sheet. In such cases, the RW control unit 201 can detect the defect of the wireless tag included in the wireless tag sheet after the image is formed on the wireless tag sheet.

A case where the carrying speed of the wireless tag sheet is controlled by the control unit 100 during reading or writing of the wireless tags will be described.

The control unit 100 slows the carrying speed of the wireless tag sheet when the sheet is in the vicinity of the second RW unit 204. Specifically, the control unit 100 controls the carrying speed so that during the reading and/or writing, a distance between the second RW unit 204 and the wireless tag is maintained at a short distance suitable for wireless communication. The control unit 100 controls the carrying speed by slowing the rotation speed of the secondary transfer roller 32 or the roller 35 in the vicinity of the carrying path 33c. As the distance between the second RW unit 204 and the wireless tag is reduced, the output signal strength transmitted by the second RW unit 204 can be reduced. That, is the output strength of the second RW unit 204 can be reduced by lowering the carrying speed of the sheet. Power consumption can be reduced by reducing the output of the second RW unit 204.

The sheet discharge switching unit 202 switches a discharge destination of the wireless tag sheet. The control unit 100 controls switching of the sheet discharge destination in the sheet discharge switching unit 202. Specifically, when acquiring the information indicating a good product output by the RW control unit 201, the control unit 100 outputs control information for discharging the wireless tag sheet to the OK tray 20a, to the sheet discharge switching unit 202. When acquiring the control information output by the control unit 100, the sheet discharge switching unit 202 discharges the wireless tag sheet to the OK tray 20a.

When a defect is detected, the control unit 100 outputs the control information for discharging the wireless tag sheet to the NG tray 20b to the sheet discharge switching unit 202. When acquiring the control information output by the control unit 100, the sheet discharge switching unit 202 discharges the wireless tag sheet to the NG tray 20b.

Specifically, the sheet discharge switching unit 202 switches the sheet discharge destination to the OK tray 20a or the NG tray 20b by switching a flap in the carrying path through which the sheet passes. The discharge destination of a defective wireless tag sheet is switched by the sheet discharge switching unit 202, thereby eliminating the work of sorting wireless tag sheets after printing. Therefore, it is possible to improve work efficiency of the user who performs the printing operation of the wireless tag sheet.

Operation of Image Forming Apparatus

Figure 7:
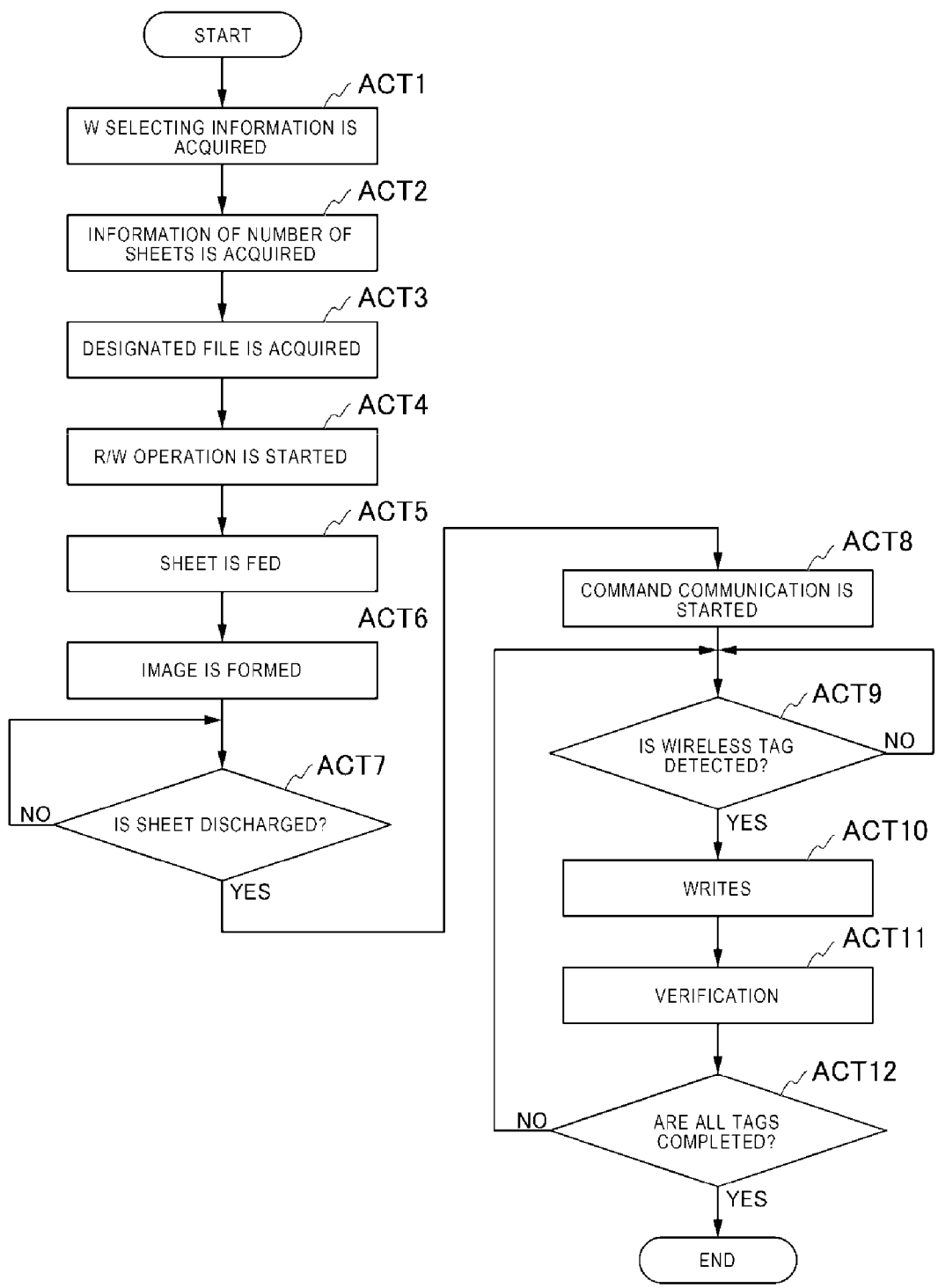
FIG. 7 is a flowchart of an operation of an image forming apparatus according to an embodiment.

FIG. 7 is a flowchart of an operation of the image forming apparatus according to the embodiment. In the example described below, the second RW unit 204 writes the information to the wireless tags which are disposed on the wireless tag sheet and then performs the verification under the control by the RW control unit 201.

(ACT 1) The user selects W (write mode) from the R/W mode displayed on the control touch panel 13. The control touch panel 13 outputs the W selection information to the control unit 100. The control unit 100 acquires the W selection information output by the control touch panel 13.

(ACT 2) The user selects a number of the R/W sheets on the control touch panel 13. The control touch panel 13 outputs of the selected number of the sheets to the control unit 100.

(ACT 3) The user selects a tag designating file displayed on the control touch panel 13. The control touch panel 13 outputs the user selection of the tag designating file to the control unit 100. Here, the possible tag designating files may be stored and set in the image forming apparatus 10 in advance.

(ACT 4) The user instructs starting the R/W operation on the control touch panel 13. The control touch panel 13 outputs a start command to the control unit 100.

(ACT 5) A wireless tag sheet from the sheet feeding cassette 16a is fed in accordance with the control unit 100. A leading end of the wireless tag sheet abuts against two stopped registration rollers 31. The wireless tag sheet abuts against the registration rollers 31 and thereby the orientation of the wireless tag sheet is corrected and the sheet feeding can be started.

(ACT 6) The control unit 100 starts the rotation of the registration roller 31 in accordance with the position of the toner image of the rotating intermediate transfer belt 21. The control unit 100 moves the wireless tag sheet to the secondary transfer roller 32. The control unit 100 transfers the toner image formed on the intermediate transfer belt 21 to the wireless tag sheet by the secondary transfer roller 32. The control unit 100 causes the wireless tag sheet to be carried on the carrying path 33a and the toner image to be fixed to the sheet by the fixing device 34, thereby an image is formed on the sheet.

(ACT 7) The control unit 100 causes the wireless tag sheet on which the image has been formed to be carried on the carrying path 33c and discharged. The control unit 100 determines whether or not the wireless tag sheet has been discharged. If the wireless tag sheet has not been discharged, the procedure returns to ACT 7 and if the wireless tag sheet has been discharged, the procedure proceeds to ACT 8.

(ACT 8) If the wireless tag sheet has been discharged, the control unit 100 outputs information indicating that the wireless tag sheet has been discharged to the RW control unit 201. When acquiring the information indicating that the wireless tag sheet has been discharged, the RW control unit 201 generates a command. In a case where a write command for writing the information to the wireless tag is generated, the procedure proceeds to ACT 9.

(ACT 9) If a write command for writing the information to the wireless tag is generated, the RW control unit 201 determines whether or not a wireless tag to be written according to the write command has been detected. Specifically, the RW control unit 201 generates a response request and outputs the response request to the second RW unit 204.

The second RW unit 204 acquires the response request and transmits the acquired response request to the wireless tag sheet.

Each wireless tag on the wireless tag sheet receives the response request transmitted by the second RW unit 204 and transmits a response with respect to the received response request at an arbitrary timing.

The second RW unit 204 receives the responses transmitted by the wireless tags and outputs the received responses to the RW control unit 201.

The RW control unit 201 acquires the responses output by the second RW unit 204. The RW control unit 201 determines that the wireless tag to be written has been detected when the acquired response is 1 and determines that the wireless tag to be written has not detected if the acquired response is not 1. If it is determined that the wireless tag that was to be written has not been detected, the procedure returns to ACT 9 and if it is determined that the wireless tag that was to be written has been detected, the procedure proceeds to ACT 10.

(ACT 10) If it is determined that the wireless tag to be written has been detected, the RW control unit 201 outputs the ACK (acknowledgment response) to the second RW unit 204.

The second RW unit 204 acquires the ACK output by the RW control unit 201 and transmits the acquired ACK. The wireless tag which transmitted the response receives the ACK and transmits an EPC (a pre-change EPC) based on the received ACK. The second RW unit 204 receives the EPC transmitted by the wireless tag and outputs the received EPC to the RW control unit 201.

The RW control unit 201 acquires the EPC output by the second RW unit 204, designates the wireless tag from which the acquired EPC was received as a tag to be written, and performs writing of a post-change EPC to the designated wireless tag.

(ACT 11) The RW control unit 201 of the image forming apparatus 10 generates the read command for reading the information stored in the wireless tag to which the post-change EPC has been written. The RW control unit 201 outputs the read command to the second RW unit 204.

The second RW unit 204 transmits the read command to the wireless tag. The wireless tag receives the read command and in response transmits the stored information according to the received read command.

The second RW unit 204 receives the information transmitted by the wireless tag and outputs this information to the RW control unit 201. The RW control unit 201 acquires the information output by the second RW unit 204 and checks that the information has been correctly written based on the information and the post-change EPC requested to be written by the write command. If it is determined that the information has not been correctly written, the RW control unit 201 again generates a write command for writing the post-change EPC to the wireless tag and outputs the this write command to the second RW unit 204. The second RW unit 204 acquires the write command output by the RW control unit 201 and transmits the acquired write command to the wireless tag. The wireless tag receives the write command transmitted by the second RW unit 204 and writes the post-change EPC according to the received write command. The RW control unit 201 again performs the verification processing. If it is determined that the post-change EPC has not been correctly written after a predetermined number of verifications has been performed, the RW control unit 201 determines that the wireless tag is defective. In a case where the information has been correctly written, the procedure proceeds to ACT 12.

(ACT 12) The RW control unit 201 determines whether or not writing of the information to all the wireless tags on the wireless tag sheet has been completed. If there is a wireless tag on the sheet to which writing of information has not been completed, the procedure returns to ACT 9. If writing to all the wireless tags has been completed, the procedure ends.

Thereafter, processing of ACT 4 to ACT 12 can be performed up to the total number of sheets designated by the user.

In the above-described example embodiments, a case where the image forming apparatus 10 forms an image on the wireless tag sheet and then performs reading of the information stored in the wireless tag on the wireless tag sheet and/or writing of the information to the wireless tag has been described, but the image forming apparatus 10 is not limited to this example. For example, the image forming apparatus 10 may perform also perform reading of the information stored in the wireless tag on the wireless tag sheet and writing of the information to the wireless tag without forming the image on the sheet. The image data printed on the wireless tag sheet may be information related to the EPC data or may be information that is not related to EPC data.

In the above-described example embodiments, cases in which there is one wireless tag, 32 wireless tags, and 72 wireless tags disposed on the sheet S have been described, but a wireless tag sheet is not limited to these examples. For example, the number of the wireless tags which are disposed on the sheet S can be arbitrarily varied.

In the above-described example embodiments, a case where the carrying speed of the wireless tag sheet is slowed in the vicinity of the registration roller 31 by slowing the rotation speed of the registration roller 31 when a defect of a wireless tag on a wireless tag sheet has been detected before an image is formed on the wireless tag sheet has been described, but the image forming apparatus 10 is not limited to this particular example. For example, the wireless tag sheet may also be fully stopped at the position of the registration roller. Therefore, a wireless tag sheet can stopped at the position of the registration roller and thereby the signal output of the first RW unit 203 can be reduced. Power consumption can be reduced by reducing the signal output of the first RW unit 203.

Thus, if an operation for reducing power consumption is to be performed, the control unit 100 may reduce the carrying speed of the wireless tag sheet or stop the wireless tag sheet.

In the above-described example embodiments, a case where the carrying speed of the wireless tag sheet is slowed in the vicinity of the second RW unit 204 by slowing the rotation speed of the roller 35 when a defect of the wireless tag on the wireless tag sheet is detected after an image has been formed on the wireless tag sheet has been described, but the image forming apparatus 10 is not limited to this particular example. For example, the wireless tag sheet may be fully stopped at the position of the second RW unit 204. Since the wireless tag sheet is stopped at the position of the second RW unit 204 and the output signal of the second RW unit 204 can be reduced. Power consumption can be reduced by reducing the output signal of the second RW unit 204.

Thus, if an operation for reducing power consumption is to be performed, the control unit 100 may reduce the carrying speed of the wireless tag sheet or stop the wireless tag sheet.

In the above-described example embodiments, a case where the sheet discharge switching unit 202 switches the sheet discharge destination between the OK tray 20a and the NG tray 20b has been described, but the image forming apparatus 10 is not limited to this example. For example, the sheet discharge destination may be switched from among three or more possible destinations. In addition, in printing on an ordinary sheet (e.g., plain paper), all such ordinary sheets may be discharged to the OK tray 20a without switching the sheet discharge destination.

In the above-described example embodiments, a case where the developing method of the developing device 28 is a tandem developing method has been described, but the image forming apparatus 10 is not limited to this particular example. For example, the developing method of the developing device 28 may be a four-cycle developing method.

In the above-described example embodiments, a case where the total number of the developing devices is four has been described, but the image forming apparatus 10 is not limited to this particular example. For example, the number of the developing devices may instead be one to three or five or more.

In the above-described example embodiments, a case where the image forming apparatus 10 includes both the first RW unit 203 and the second RW unit 204 has been described, but the image forming apparatus 10 is not limited to this example. For example, the image forming apparatus 10 may only include the second RW unit 204 without including the first RW unit 203. With such a configuration, since processing is not performed by the first RW unit 203, the sheet processing speed can be improved.

In the above-described example embodiments, a case where the image forming apparatus 10 performs one or both of reading of the information stored in the wireless tag and writing of the information to the wireless tag has been described, but the image forming apparatus 10 is not limited to this example. For example, the image forming apparatus 10 may form an image after one or both of reading of the information stored in the wireless tag and writing of the information to the wireless tag has been performed.

According to at least one of the above-described example embodiments, the image forming apparatus 10 incorporates the printer 130, the second RW unit 204, the RW control unit 201, and the control unit 100. The printer 130 is used to form the images on the wireless tag sheet. The second RW unit 204 performs reading of the information stored in the wireless tag and writing of the information to the wireless tag.

The RW control unit 201 performs one or both of reading of the information stored in each of the wireless tags or writing of the information to the wireless tags based on the identification information stored in the wireless tags on the wireless tag sheet by controlling the second RW unit 204. The control unit 100 controls the carrying speed of the wireless tag sheet according to the number of the wireless tags on the wireless tag sheet by controlling the printer 130. With such a configuration, the image forming apparatus 10 controls the carrying speed of the wireless tag sheet according to the number of the wireless tags disposed on the wireless tag sheet. Therefore, reading and writing can be continuously performed with respect to the wireless tags on the wireless tag sheet.

In addition, the second RW unit 204 is disposed at a position to which the wireless tag sheet on which the image is to be formed by the printer 130 is carried. The control unit 100 causes the wireless tag sheet on which the image is formed to be carried to the second RW unit 204. With such a configuration, reading and writing can be performed with respect to each of the wireless tags on the wireless tag sheet after the image has been formed thereon.

In addition, the RW control unit 201 reads the information stored in the wireless tag after writing of the information to the wireless tag has been performed. The RW control unit 201 thus can determine whether or not the read information coincides with the written information. If it is determined that the read information does not coincide with the written information, the RW control unit 201 again performs writing of the information to the wireless tag. With such a configuration, it is possible to check that the information is correctly written to the wireless tag. In addition, if the information is not correctly written, writing of the information to the wireless tag can be repeated.

The RW control unit 201 can also determines whether or not the read information matches the intended written information after writing to the wireless tag has been performed, and the control unit 100 can change the discharge destination of any wireless tag sheet on which a defective wireless tag is disposed when it is determined that the read information does not coincide with the intended written information. With such a configuration, it is possible to confirm that the information is correctly written to the wireless tag. If the information is not correctly written, the sheet discharge destination of the wireless tag sheet on which the defective wireless tag is disposed can be changed.

The second RW unit 204 transmits a response request to the wireless tags on a wireless tag sheet. If the response transmitted by any one of the wireless tags with respect to the transmitted response request is received, the second RW unit 204 transmits an acknowledgment response. With such a configuration, it is possible to check for the presence of wireless tags on the wireless tag sheet.

If the identification information transmitted by any one of the wireless tags with respect to the acknowledgment response is received, the second RW unit 204 performs reading and/or writing with respect to the wireless tag which transmitted the identification information. With such a configuration, it is possible to perform reading of the stored information and writing of the information with respect to any one of the wireless tags on the wireless tag sheet.

If it is detected that the response transmitted by any one of the wireless tags conflicts with another wireless tag, the second RW unit 204 transmits again the response request to the wireless tags on the wireless tag sheet after a certain time period elapses. With such a configuration, it is possible to check again for the presence of a wireless tag on the wireless tag sheet even if the response transmitted by any one of the wireless tags conflicts with another tag.

The second RW unit 204 re-transmits the number of times corresponding to the number of the wireless tags which are disposed on the wireless tag sheet and the response request. With such a configuration, even if the response transmitted by any one of the wireless tags conflicts, it is possible to check again the presence of the wireless tag which is disposed on the wireless tag sheet.

The RW control unit 201 performs acquisition of the EPC output stored in each of the wireless tags and writing of a new EPC to the wireless tag. With such a configuration, it is possible to rewrite the EPC stored in the wireless tag.

The above-described image forming apparatus may contain a computer or computer processor therein. A program for accomplishing processing aspects of each of the above-described devices can be stored in a non-volatile computer-readable recording medium. The program can read and executed by a computer and thereby the computer performs the described processing. Here, a computer-readable recording medium means a magnetic disk, a magneto-optical disk, a CD-ROM, a DVD-ROM, a non-volatile semiconductor memory, or the like. The computer program may be distributed through a communication line (network connection) and the computer receiving the distribution may execute the program. The program may also be for realizing a part or parts of the above-described processing functions.

The program which can realize the above-described functions may be a differential program, also referred to referred to as a differential file, combined with another program already recorded in the computer.

In the above-described example embodiments, the second RW unit 204 is an example of the reading and writing unit, the wireless tag sheet is an example of a sheet, and an EPC is an example of identification information. In addition, in the above-described example embodiments, the RW control unit is an example of the reading/writing control unit, the control unit is an example of the printer control unit, and the post-change EPC is an example of a new EPC.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
   a printer configured to form an image on a sheet at a carrying speed;
   a first reading/writing unit configured to read tag information stored in a wireless tag disposed on the sheet and to write tag information to the wireless tag;
   a reading/writing control unit configured to control the first reading/writing unit to read tag information stored in the wireless tag and to write tag information to the wireless tag; and
   a printer control unit configured to control the carrying speed of the sheet according to a total number of wireless tags disposed on the sheet.

2. The image forming apparatus according to claim 1, wherein
   the first reading/writing unit is downstream of the printer along a sheet carrying direction, and
   the printer control unit causes the sheet to be carried along the sheet carrying direction to the first reading/writing unit.

3. The image forming apparatus according to claim 1, wherein the reading/writing control unit is configured to:

control the first reading/writing unit to write tag information to the wireless tag, then to read tag information from the wireless tag, and then check whether the tag information read by the first reading/writing unit coincides with the tag information written by the first reading/writing unit, and control the first reading/writing unit to write the tag information to the wireless tag again if the read tag information does not coincide with the written tag information.

4. The image forming apparatus according to claim 1, wherein the reading/writing control unit is configured to:

control the first reading/writing unit to write tag information to the wireless tag, then to read tag information from the wireless tag, and then check whether the tag information read by the first reading/writing unit coincides with the tag information written by the first reading/writing unit, control the printer control unit to discharge the sheet from a first tray if the read tag information coincides with the written tag information, and control the printer control unit to discharge the sheet from a second tray if the read tag information does not coincide with the written tag information.

5. The image forming apparatus according to claim 1, wherein the reading/writing control unit causes the carrying speed of the sheet to be reduced according to the total number of wireless tags disposed on the sheet.

6. The image forming apparatus according to claim 1, further comprising:

a second reading/writing unit configured to transmit a response request to the wireless tag in accordance with the reading/writing control unit and to receive a response from the wireless tag, wherein if a response transmitted by the wireless tag in response to the response request is received, the second reading/writing unit transmits an acknowledgment response to the wireless tag.

7. The image forming apparatus according to claim 6, wherein if identification information transmitted by the wireless tag in response to the acknowledgement response is received, the first reading/writing unit reads the tag information stored in the wireless tag and writes tag information to the wireless tag.

8. The image forming apparatus according to claim 6, wherein if the response transmitted by any one of a plurality of wireless tags on the sheet conflicts with another response transmitted by another one of the plurality of wireless tags on the sheet, the second reading/writing unit re-transmits a response request to the plurality of wireless tags after a predetermined time elapses.

9. The image forming apparatus according to claim 8, wherein the second reading/writing unit re-transmits the response request up to a number of times corresponding to the total number of wireless tags in the plurality of wireless tags on the sheet.

10. The image forming apparatus according to claim wherein the reading/writing control unit is further configured to read identification information stored in each of the plurality of wireless tags and to update to the identification information on each of the plurality of wireless tags.

11. A method for controlling an image forming apparatus, the method comprising:

forming an image on a sheet;

controlling a carrying speed of the sheet according to a total number of wireless tags disposed on the sheet;

reading tag information stored in a wireless tag on the sheet; and writing tag information to the wireless tag.

12. The method according to claim 11, further comprising:

writing tag information to the wireless tag;

read tag information from the wireless tag;

checking whether the tag information read from the wires tag coincides with the tag information written to the wireless tag; and writing the tag information to the wireless tag again if the read tag information does not coincide with the written tag information.

13. The method according to claim 11, further comprising:

writing tag information to the wireless tag;

reading tag information from the wireless tag;

checking whether the tag information read from the wireless tag coincides with the tag information written to the wireless tag;

discharging the sheet from a first tray if the read tag information coincides with the written tag information; and discharging the sheet from a second tray if the read tag information does not coincide with the written tag information.

14. The method according to claim 11, further comprising:

transmitting a response request to the wireless tag;

receiving a response from the wireless tag; and transmitting an acknowledgment response to the wireless tag if a response transmitted by the wireless tag in response to the response request is received.

15. The method according to claim 14, further comprising:

reading the tag information stored in the wireless tag and writing tag information to the wireless tag if identification information transmitted by the wireless tag in response to the acknowledgement response is received.

16. The method according to claim 14, wherein, if the response transmitted by any one of a plurality of wireless tags on the sheet conflicts with another response transmitted by another one of the plurality of wireless tags on the sheet, re-transmitting a response request to the plurality of wireless tags after a predetermined time elapses.

17. The method according to claim 16, further comprising:

re-transmitting the request up to a number of times corresponding to the total number of wireless tags in the plurality of wireless tags on the sheet.

18. A controller for a printer, comprising:

a first reading/writing unit configured to read tag information stored in each of a plurality of wireless tags disposed on a sheet and to write tag information to each of the plurality of wireless tags;

a reading/writing control unit configured to control the first reading/writing unit based on identification information stored in each of the plurality of wireless tags; and a printer control unit configured to control the printer to change a carrying speed of the sheet according to a number of the plurality of wireless tags disposed on the sheet.

19. The controller according to claim 18, wherein the reading/writing control unit is configured to:

control the first reading/writing unit to write tag information to the wireless tag, then to read tag information from the wireless tag, and then check whether the tag information read by the first reading/writing unit coincides with the tag information written by the first reading/writing unit, and control the first reading/writing unit to write the tag information to the wireless tag again if the read tag information does not coincide with the written tag information.

20. The controller according to claim 18, further comprising:

a second reading/writing unit configured to transmit a response request to the wireless tag in accordance with the reading/writing control unit and to receive a response from the wireless tag, wherein if a response transmitted by the wireless tag in response to the response request is received, the second reading/writing unit transmits an acknowledgment response to the wireless tag, and if identification information transmitted by the wireless tag in response to the acknowledgement response is received, the first reading/writing unit reads the tag information stored in the wireless tag and writes tag information to the wireless tag.

* * * * *